United States Patent
Ono et al.

(10) Patent No.: US 11,746,200 B2
(45) Date of Patent: Sep. 5, 2023

(54) FIBER-REINFORCED RESIN MOLDING MATERIAL AND MOLDED ARTICLE

(71) Applicant: Toray Industries, Inc., Tokyo (JP)

(72) Inventors: Yasukazu Ono, Nagoya (JP); Takafumi Hashimoto, Nagoya (JP); Akira Shimoyama, Nagoya (JP); Tetsuya Motohashi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 216 days.

(21) Appl. No.: 17/280,564

(22) PCT Filed: Sep. 24, 2019

(86) PCT No.: PCT/JP2019/037367
§ 371 (c)(1),
(2) Date: Mar. 26, 2021

(87) PCT Pub. No.: WO2020/067058
PCT Pub. Date: Apr. 2, 2020

(65) Prior Publication Data
US 2022/0049061 A1 Feb. 17, 2022

(30) Foreign Application Priority Data
Sep. 28, 2018 (JP) .................. 2018-184573

(51) Int. Cl.
*C08J 5/24* (2006.01)
*B29C 70/50* (2006.01)
*C08K 7/06* (2006.01)

(52) U.S. Cl.
CPC ............. *C08J 5/243* (2021.05); *B29C 70/502* (2013.01); *C08K 7/06* (2013.01);
(Continued)

(58) Field of Classification Search
CPC ........ Y10T 428/24994; B29K 2077/00; B29K 2101/12; B29K 2105/0872;
(Continued)

(56) References Cited

U.S. PATENT DOCUMENTS

2015/0031257 A1  1/2015  Ootsubo et al.
2017/0008260 A1  1/2017  Fujii et al.
(Continued)

FOREIGN PATENT DOCUMENTS

CN  111263696 A  6/2020
JP  H01-163218  6/1989
(Continued)

OTHER PUBLICATIONS

First Office Action dated Oct. 31, 2022, of counterpart Chinese Patent Application No. 201980058890.2, along with an English translation.

*Primary Examiner* — Camie S Thompson
(74) *Attorney, Agent, or Firm* — DLA Piper LLP (US)

(57) ABSTRACT

A fiber-reinforced resin molding material is obtained by impregnating a chopped fiber bundle with a matrix resin, has a layered structure including three or more layers in a thickness direction thereof, and satisfies the relationships Lao>Lam and Wao>Wam, where Lao and Wao represent the number average fiber length and the number average fiber bundle width, respectively, of the chopped fiber bundle in the outermost layer thereof, and Lam and Wam represent the number average fiber length and the number average fiber bundle width, respectively, of the chopped fiber bundle in a middle layer thereof.

12 Claims, 2 Drawing Sheets

(52) U.S. Cl.
CPC ... *B29C 2793/0027* (2013.01); *C08J 2333/04* (2013.01); *C08J 2363/00* (2013.01); *C08J 2367/00* (2013.01); *C08K 2201/004* (2013.01)

(58) Field of Classification Search
CPC ..... B29K 2307/04; B29C 43/02; B29C 70/12; B29C 70/40; B29C 70/42; B29C 70/46; B29C 70/18; B29C 70/502; B29C 2793/0027; B29C 70/50; B32B 27/08; B32B 27/12; B32B 27/32; B32B 5/02; B32B 5/26; B32B 7/022; B32B 7/06; B32B 2262/16; B32B 2250/20; B32B 2307/18; B32B 2307/748; B32B 2307/54; B32B 2605/00; B32B 2605/003; B32B 2607/042; C08J 5/243; C08J 5/04; C08J 5/042; C08J 2333/04; C08J 2367/00; C08J 5/24; C08K 7/02; C08K 7/06; C08K 2001/004; C08L 31/02; C08L 63/00; C08L 67/02

USPC ........................ 428/220, 297.4, 401; 264/257
See application file for complete search history.

(56) References Cited

U.S. PATENT DOCUMENTS

| | | |
|---|---|---|
| 2020/0346441 A1 | 11/2020 | Seike et al. |
| 2020/0398524 A1 | 12/2020 | Seike et al. |

FOREIGN PATENT DOCUMENTS

| | | |
|---|---|---|
| JP | 2009-062648 | 3/2009 |
| WO | 2013/094706 | 6/2013 |
| WO | 2015/115225 | 8/2015 |
| WO | 2018/143068 A1 | 8/2018 |
| WO | 2018/143968 | 8/2018 |

FIG. 5 ning material exhibiting excellent fluidity of fiber-reinforced resin molding material and a molded article exhibiting excellent mechanical properties of fiber-reinforced plastics.

FIBER-REINFORCED RESIN MOLDING MATERIAL AND MOLDED ARTICLE

TECHNICAL FIELD

This disclosure relates to a fiber-reinforced resin molding material produced by impregnating a sheet-like deposit of chopped fiber bundles that are cut from continuous reinforcing fiber with matrix resin and a molded article made from a fiber-reinforced resin molding material.

BACKGROUND

Fiber-reinforced plastics having a complicated shape such as three-dimensional shape can be formed by heating/pressurizing a fiber-reinforced resin molding material made from matrix resin and a chopped fiber bundle mat in which chopped fiber bundles of discontinuous reinforcing fibers made by chopping continuous reinforcing fiber are randomly dispersed. Such a molding material includes the Sheet Molding Compound (which may be called "SMC").

Molded article made from fiber-reinforced resin molding material such as the SMC can be produced by heating/pressurizing with a heating type pressing machine an SMC sheet made by impregnating a chopped fiber bundle mat comprising chopped fiber bundles having a length of about 12.5 mm with matrix resin. In many instances, because the SMC sheets cut into pieces smaller than the molded article are placed in a die and pressurized to flow to mold a bigger product, a complicated shape such as three-dimensional shape can be made. However, the SMC sheet may solidify and cause uneven orientation in a sheet-forming process while chopped fiber bundles having poor fluidity are insufficiently stretched. Therefore, molded articles may warp and have sink marks as well as deteriorated mechanical properties and variance.

JP-H01-163218-A discloses SMC sheets having suppressed generation and development of crack achieved by dispersing chopped fiber bundles made by cutting carbon fibers of less than 1,000 fibers.

JP2009-62648-A discloses a production method of SMC sheet exhibiting excellent mechanical properties achieved by cutting widened reinforcing fiber bundles to make chopped fiber bundles flat.

To produce the SMC sheet disclosed in JP-H01-163218-A from chopped fiber bundles made of carbon fibers of less than 1,000 fibers, it is necessary to employ uneconomical material of either an expensive carbon fiber of smaller filament number or a fiber-separated inexpensive carbon fibers of larger filament number. Further, reduced bundle number of chopped fiber bundles may make a sheet-like deposit of chopped fiber bundle bulky so that matrix resin impregnation is blocked while producing the SMC.

Furthermore, the flat-shaped chopped fiber bundle disclosed in JP2009-62648-A may deteriorate fluidity at the time of molding because of larger width of chopped fiber bundle.

There is another problem that sufficient mechanical properties cannot be exhibited when fiber-reinforced resin molding material such as the SMC sheet is heated/pressurized with a heating type pressing machine because the outermost layer part contacting high-temperature mold face tends to flow because of reduced resin viscosity whereas thermally less conductive central layer part hardly flows because of slightly reduced resin viscosity.

Accordingly, it could be helpful to provide a fiber-reinforced resin molding material exhibiting excellent flu-

SUMMARY

We thus provide:

[1] A fiber-reinforced resin molding material [C] of a chopped fiber bundle [A] impregnated with a matrix resin [B], having a layered structure including three or more layers in a thickness direction of the fiber-reinforced resin molding material [C] and satisfying Formula (1) and Formula (2), wherein Lao and Wao are respectively a number average fiber length and a number-average fiber bundle width of a chopped fiber bundle [Ao] in an outermost layer, Lam and Wam are respectively a number average fiber length and a number-average fiber bundle width of a chopped fiber bundle [Am] in a middle layer, $$Lao > Lam \quad (1)$$

$$Wao > Wam \quad (2).$$

[2] The fiber-reinforced resin molding material according to [1], further satisfying Formula (3), wherein Tao is a number average fiber bundle thickness of the chopped fiber bundle [Ao] in the outermost layer and Tam is a number average fiber bundle thickness of the chopped fiber bundle [Am] in the middle layer, $$Tao > Tam \quad (3).$$

[3] A fiber-reinforced resin molding material [C] of a chopped fiber bundle [A] impregnated with a matrix resin [B], having a layered structure including three or more layers in a thickness direction of the fiber-reinforced resin molding material [C] and satisfying Formula (1) and Formula (3), wherein Lao and Tao are respectively a number average fiber length and a number-average fiber bundle thickness of a chopped fiber bundle [Ao] in an outermost layer, Lam and Tam are respectively a number average fiber length and a number-average fiber bundle thickness of a chopped fiber bundle [Am] in a middle layer, $$Lao > Lam \quad (1)$$

$$Tao > Tam \quad (3).$$

[4] The fiber-reinforced resin molding material according to [3], further satisfying Formula (2), wherein Wao is a number average fiber bundle width of the chopped fiber bundle [Ao] in the outermost layer and Wam is a number average fiber bundle width of the chopped fiber bundle [Am] in the middle layer, $$Wao > Wam \quad (2).$$

[5] The fiber-reinforced resin molding material according to any one of [1] to [4], further satisfying Formula (4), wherein the Lao is the number average fiber length of the chopped fiber bundle [Ao] in the outermost layer and the Lam is the number average fiber length of the chopped fiber bundle [Am] in the middle layer, $$1.05 < Lao/Lam < 1.30 \quad (4).$$

[6] The fiber-reinforced resin molding material according to any one of [1] to [5], further satisfying Formula (5), wherein Wao is a number average fiber bundle width of the chopped fiber bundle [Ao] in the outermost layer and Wam is a number average fiber bundle width of the chopped fiber bundle [Am] in the middle layer, $$1.05 < Wao/Wam < 1.50 \quad (5).$$

[7] The fiber-reinforced resin molding material according to any one of [1] to [6], further satisfying Formula (6), wherein Tao is a number average fiber bundle thickness of the chopped fiber bundle [Ao] in the outermost layer and Tam is a number average fiber bundle thickness of the chopped fiber bundle [Am] in the middle layer, $$1.01 < Tao/Tam < 2.00 \quad (6).$$

[8] The fiber-reinforced resin molding material according to any one of [1] to [7], wherein a number average fiber length La of the chopped fiber bundle [A] is 3 mm or more and 100 mm or less.

[9] The fiber-reinforced resin molding material according to any one of [1] to [8], wherein a number average fiber bundle width Wa of the chopped fiber bundle [A] is 0.1 mm or more and 60 mm or less.

The fiber-reinforced resin molding material according to any one of [1] to [9], wherein a number average fiber bundle thickness Ta of the chopped fiber bundle [A] is 0.01 mm or more and 0.50 mm or less.

The fiber-reinforced resin molding material according to any one of [1] to [10], wherein a cutting angle θ of the chopped fiber bundle [A] is within a range of 0°<θ<90°.

The fiber-reinforced resin molding material according to any one of [1] to [11], wherein the matrix resin [B] is a thermosetting resin selected from vinyl ester resin, epoxy resin and unsaturated polyester resin.

A molded article made by a compression forming of the fiber-reinforced resin molding material according to any one of [1] to [12].

Our fiber-reinforced resin molding material can therefore exhibit excellent fluidity while our molded article can exhibit excellent mechanical properties.

EXPLANATION OF SYMBOLS

1: chopped fiber bundle
2: carbon fiber
3: yarn restriction unit
4: cutter roll
5: distributor
6: thermosetting resin
7: film
8: conveyer
9: resin impregnation step
10: fiber-reinforced resin molding material
11: wire
12: distributor rotation axis A: cutting step
B: sheet-forming step
Lc: distributor width

DETAILED DESCRIPTION

Our fiber-reinforced resin molding material has a first configuration as a fiber-reinforced resin molding material [C] of a chopped fiber bundle [A] impregnated with a matrix resin [B], having a layered structure including three or more layers in a thickness direction of the fiber-reinforced resin molding material [C] and satisfying Formula (1) and Formula (2), wherein Lao and Wao are respectively a number average fiber length and a number-average fiber bundle width of a chopped fiber bundle [Ao] in an outermost layer, Lam and Wam are respectively a number average fiber length and a number-average fiber bundle width of a chopped fiber bundle [Am] in a middle layer, $$Lao > Lam \quad (1)$$

$$Wao > Wam \quad (2).$$

Our fiber-reinforced resin molding material has a second configuration as a fiber-reinforced resin molding material [C] of a chopped fiber bundle [A] impregnated with a matrix resin [B], having a layered structure including three or more layers in a thickness direction of the fiber-reinforced resin molding material [C] and satisfying Formula (1) and Formula (3), wherein Lao and Tao are respectively a number average fiber length and a number-average fiber bundle thickness of a chopped fiber bundle [Ao] in an outermost layer, Lam and Tam are respectively a number average fiber length and a number-average fiber bundle thickness of a chopped fiber bundle [Am] in a middle layer, $$Lao > Lam \quad (1)$$

$$Tao > Tam \quad (3).$$

Our chopped fiber bundle is made by cutting a number of continuous reinforcing fiber bundles unidirectionally oriented at intervals along fiber longitudinal direction. The reinforcing fiber includes organic fibers such as aramid fiber, polyethylene fiber and poly-p-phenylene benzoxazole (PBO) fiber, inorganic fibers such as glass fiber, carbon fiber, silicon carbide fiber, alumina fiber, tyranno fiber, basalt fiber and ceramic fiber, metal fibers such as stainless steel fiber and steel fiber, and reinforcing fibers made of boron fiber, natural fiber or modified natural fiber. Above all, carbon fibers (PAN-based carbon fiber, specifically) that are lightweight and excellent in specific strength and specific elastic modulus as well as heat resistance and chemical resistance are used suitably to make automotive panel members or the like for weight saving.

Our matrix resin includes thermosetting resin such as epoxy resin, unsaturated polyester resin, vinyl ester resin, phenolic resin, epoxy acrylate resin, phenoxy resin, alkyd resin, urethane resin, maleimide resin and cyanate resin. Specifically, epoxy resin, unsaturated polyester resin or vinyl ester resin can be used suitably to make SMC sheets because of excellent interface adhesion exhibited to reinforcing fibers. The thermosetting resin may contain additives, fillers, coloring agents or the like.

Our fiber-reinforced resin molding material can be made by impregnating chopped fiber bundles with matrix resin. Specifically, SMC (sheet molding compound) made from thermosetting matrix resin can be used as an intermediate of molded articles. It is preferable that the SMC contains the matrix resin of 20 mass % to 75 mass %, on the basis of total weight of chopped fiber bundle.

The first configuration of our fiber-reinforced resin molding material is focused on the number of layers in which chopped fiber bundles having the same fiber length and the same fiber bundle width are randomly oriented in the thickness direction of fiber-reinforced resin molding material. When the fiber-reinforced resin molding material is heated/pressurized with a heating type pressing machine, the outermost layer part contacting the mold face at a high temperature tends to flow by reduced resin viscosity. Accordingly, it is preferable that the outermost layer comprises chopped fiber bundles having a long fiber length and a wide fiber bundle width excellent in reinforcement. On the other hand, the less thermally conductive middle layer part having a slightly reduced resin viscosity cannot flow easily. Accordingly, it is preferable that the middle layer comprises chopped fiber bundles having a short fiber length and a narrow fiber bundle excellent in fluidity. To mold a product excellent in mechanical properties, it is preferable that the fiber-reinforced resin molding material has a lamination structure comprising three or more layers of which outermost top and bottom layers and a middle layer. To mold a product without warp, it is preferable that the lamination structure is plane-symmetrical.

The outermost layers are layers provided at the top and the bottom in the thickness direction of fiber-reinforced resin molding material while the middle layer is designed as a layer other than the faces appearing at the top and bottom sides.

The second configuration of our fiber-reinforced resin molding material is focused on the number of layers in which chopped fiber bundles having the same fiber length and the same fiber bundle thickness are randomly oriented in the thickness direction of fiber-reinforced resin molding material. When the fiber-reinforced resin molding material is heated/pressurized with a heating type pressing machine, the outermost layer part contacting the mold face at a high temperature tends to flow by reduced resin viscosity. Accordingly, it is preferable that the outermost layer comprises chopped fiber bundles having a long fiber length and a thick fiber bundle width excellent in reinforcement. On the other hand, the less thermally conductive middle layer part having a slightly reduced resin viscosity cannot flow easily. Accordingly, it is preferable that the middle layer comprises chopped fiber bundles having a short fiber length and a thin fiber bundle excellent in fluidity. To mold a product excellent in mechanical properties, it is preferable that the fiber-reinforced resin molding material has a lamination structure comprising three or more layers of which outermost top and bottom layers and a middle layer. To mold a product without warp, it is preferable that the lamination structure is plane-symmetrical.

The outermost layers are layers provided at the top and the bottom in the thickness direction of fiber-reinforced resin molding material while the middle layer is designed as a layer other than the faces appearing at the top and bottom sides.

It is possible that a plurality of our fiber-reinforced resin molding material sheets are stacked to mold a product. A molded article having a uniform cross section to make mechanical properties excellent can be produced either by stacking first chopped fiber bundle layers and second chopped fiber bundle layers alternately or stacking third chopped fiber bundle layers and fourth chopped fiber bundle layers alternately, the first chopped fiber bundle layers excellent in reinforcement having a great fiber length and a great fiber bundle width, the second chopped fiber bundle layers excellent in fluidity having a small fiber length and a small fiber bundle width, the third chopped fiber bundle layers excellent in reinforcement having a great fiber length and a great fiber bundle thickness and the fourth chopped fiber bundle layers excellent in fluidity having a small fiber length and a small fiber bundle thickness. For example, the molded article having a uniform cross section has less a fiber disturbance around the outermost layer in the thickness direction of molded article.

Chopped fiber bundles are randomly oriented substantively so that each of four sections ($-90°≤\theta<-45°$, $-45°≤\theta<0°$, $0°≤\theta<45°$, $45°≤\theta<90°$) of orientation direction of dispersed chopped fiber bundles has a relatively uniform distribution within 25±2.5% of proportion to the total fiber bundles oriented in direction range of $-90°≤\theta<90°$ from a certain direction. When the chopped fiber bundles are randomly oriented substantively, the fiber-reinforced resin molding material of chopped fiber bundle impregnated with matrix resin can be handled like isotropic material used to design molded articles easily.

The fiber orientation of chopped fiber bundles can be determined as follows. First, images of chopped fiber bundle sliced in mat thickness direction are taken so that all of chopped fiber bundles are seen over the mat thickness direction from the chopped fiber bundle mat. To take the sliced images, the method is not particularly limited, media transcription of chopped fiber bundle is performed repeatedly over the mat thickness direction while keeping the chopped fiber bundle orientation to take images transcripted. "All" of chopped fiber bundles means a proportion of 90% or more of chopped fiber bundles existing in the measurement range. Next, the angle of fiber longitudinal direction of chopped fiber bundle is measured in the taken images. Such a measurement of angle of fiber longitudinal direction may be performed with a computer by an image processing software, or alternatively may be performed by hands with a protractor although it is time consuming. The measured fiber longitudinal direction angles are categorized into four-directional distribution by histogram. The mat having an area of 10,000 mm² or more is subject to the measurement.

Chopped fiber bundle [Ao] constituting the outermost layer of fiber-reinforced resin molding material has number average fiber length Lao (mm), number average fiber bundle width Wao (mm) and number average fiber bundle thickness Tao (mm). Chopped fiber bundle [Am] constituting the middle layer of fiber-reinforced resin molding material has number average fiber length Lam (mm), number average fiber bundle width Wam (mm) and number average fiber bundle thickness Tam (mm).

The number average fiber length of chopped fiber bundles can be determined as follows. Randomly selected 100 chopped fiber bundles in a chopped fiber bundle mat are subject to two-point measurement of lengths $L_1$ and $L_2$ depicted in FIG. 1 of each chopped fiber bundle to calculate an average value. The average length of 100 chopped fiber bundles is defined as the number average fiber length. The measurement may be performed with a computer by an image processing software, or alternatively may be performed by hands with a vernier caliper.

The number average width of chopped fiber bundles can be determined as follows. Randomly selected 100 chopped fiber bundle in a chopped fiber bundle mat are subject to measurement of maximum width $W_1$ depicted in FIG. 1 of each chopped fiber bundle to calculate an average value defined as number average width Wa. The measurement may be performed with a computer by an image processing software, or alternatively may be performed by hands with a vernier caliper. The measured 100 chopped fiber bundles may be the same as samples of the measurement of the number average fiber length.

The number average thickness of chopped fiber bundles can be determined as follows. Randomly selected 100 chopped fiber bundles in a chopped fiber bundle mat are subject to measurement of fiber bundle thickness of chopped fiber bundle onto which 30 g load is applied with an indenter having a flat face and diameter of 11.28 mm, in a condition that each chopped fiber bundle is placed between the flat face and a plane provided in parallel therewith so that the plane is in parallel with another plane including fiber length $L_1$ and fiber bundle width $W_1$ of chopped fiber bundle. The average thickness of 100 chopped fiber bundles is defined as number average thickness Ta. The measured 100 chopped fiber bundles may be the same as samples of the measurement of the number average fiber length.

In the first configuration of the fiber-reinforced resin molding material, it is important that number average fiber length Lao (mm) of chopped fiber bundle [Ao] in the outermost layer is larger than number average fiber length Lam (mm) of chopped fiber bundle [Am] in the middle layer, satisfying Lao>Lam. Further, it is important that number average fiber bundle width Wao (mm) of chopped fiber bundle [Ao] in the outermost layer is larger than number average fiber bundle width Wam (mm) of chopped fiber bundle [Am] in the middle layer, satisfying Wao>Wam. When Lao≤Lam or Wao≤Wam is satisfied, sufficient mechanical properties of chopped fiber bundle cannot be exhibited because the outermost layer part has a fluidity worse than that of the middle layer.

In the first configuration of the fiber-reinforced resin molding material, it is preferable that number average fiber bundle thickness Tao (mm) of chopped fiber bundle [Ao] in the outermost layer is larger than number average fiber bundle thickness Tam (mm) of chopped fiber bundle [Am] in the middle layer, satisfying Tao>Tam. Within the preferable range, the fiber-reinforced resin molding material can be heated/pressurized with a heating type pressing machine while achieving improved fluidity and excellent mechanical properties of fiber-reinforced resin molding material.

In the second configuration of the fiber-reinforced resin molding material, it is important that number average fiber length Lao (mm) of chopped fiber bundle [Ao] in the outermost layer is larger than number average fiber length Lam (mm) of chopped fiber bundle [Am] in the middle layer, satisfying Lao>Lam. Further, it is important that number average fiber bundle thickness Tao (mm) of chopped fiber bundle [Ao] in the outermost layer is larger than number average fiber bundle thickness Tam (mm) of chopped fiber bundle [Am] in the middle layer, satisfying Tao>Tam. When Lao≤Lam or Tao≤Tam is satisfied, sufficient mechanical properties of chopped fiber bundle cannot be exhibited because the outermost layer part has a fluidity worse than that of the middle layer.

In the second configuration of the fiber-reinforced resin molding material, it is preferable that number average fiber bundle width Wao (mm) of chopped fiber bundle [Ao] in the outermost layer is larger than number average fiber bundle width Wam (mm) of chopped fiber bundle [Am] in the middle layer, satisfying Wao>Wam. Within the preferable range, the fiber-reinforced resin molding material can be heated/pressurized with a heating type pressing machine while achieving improved fluidity and excellent mechanical properties of fiber-reinforced resin molding material.

Because our fiber-reinforced resin molding material has a desirable interlayer overlap hard to exfoliate in the thickness direction of fiber-reinforced resin molding material, it is preferable that number average fiber length Lao (mm) of chopped fiber bundle [Ao] in the outermost layer and number average fiber length Lam (mm) of chopped fiber bundle [Am] in the middle layer satisfy the formula of 1.05<Lao/Lam<1.30, and preferably 1.10<Lao/Lam<1.20.

Further, it is preferable that number average fiber bundle width Wao (mm) of chopped fiber bundle [Ao] in the outermost layer and number average fiber bundle width Wam (mm) of chopped fiber bundle [Am] in the middle layer satisfy the formula of 1.05<Wao/Wam<1.50, preferably 1.15<Wao/Wam<1.45.

Furthermore, it is preferable that number average fiber bundle thickness Tao (mm) of chopped fiber bundle [Ao] in the outermost layer and number average fiber bundle thickness Tam (mm) of chopped fiber bundle [Am] in the middle layer satisfy the formula of 1.01<Tao/Tam<2.00. It is more preferably 1.05<Tao/Tam<1.80, and is further preferably 1.10<Tao/Tam<1.75, specifically preferably 1.15<Tao/Tam<1.70.

In the fiber-reinforced resin molding material, it is preferable that the chopped fiber bundles have average fiber length La (mm) of 3 mm to 100 mm. When the chopped fiber bundles have number average fiber length La of 100 mm or less, a product can be molded as excellent in forming followability of complicated shape. Because fibers do not flow along the fiber longitudinal direction in a case of continuous fiber mat or fabric such as woven fabric, a complicated shape cannot be molded without shaping along a predetermined shape. The average fiber length of less than 3 mm might not achieve high mechanical properties even when other requirements are satisfied although a product can be molded as excellent in forming followability of complicated shape. From a viewpoint of relation between followability to complicated shapes of molded articles and mechanical properties, the length is 5 mm to 50 mm, preferably 8 mm to 30 mm.

In the fiber-reinforced resin molding material, it is preferable that number average width Wa (mm) of chopped fiber bundle is 0.1 mm to 60 mm. When number average width Wa (mm) of chopped fiber bundles is less than 0.1 mm, chopped fiber bundles having the number average fiber length of 3 mm to 100 mm might bend from the fiber longitudinal direction to lose the fiber straightness in a process of molding a product before finishing molded articles. Therefore, mechanical properties such as reinforcement of reinforcing fibers in molded articles may not be exhibited sufficiently. On the other hand, number average width Wa (mm) of more than 60 mm may have insufficient resin impregnation in the fiber-reinforced resin molding material, or may decrease fluidity to deteriorate mechanical properties of molded article. It is more preferable that number average width Wa (mm) is 0.5 mm to 50 mm, preferably 1 mm to 30 mm. The long side and the short side of chopped fiber cross section are called "width" and "thickness", respectively.

In the fiber-reinforced resin molding material, it is preferable that the chopped fiber bundles have a number average thickness Ta (mm) of 0.01 mm to 0.50 mm. When number average thickness Ta (mm) of chopped fiber bundles is less than 0.01 mm, chopped fiber bundles having the number average fiber length of 3 mm to 100 mm might bend from the fiber longitudinal direction to lose the fiber straightness in a process of molding a product. Therefore, mechanical properties such as reinforcement of reinforcing fibers in molded articles may not be exhibited sufficiently. On the other hand, number average thickness Ta (mm) of more than 0.50 mm may have insufficient resin impregnation in the fiber-reinforced resin molding material, or may decrease fluidity to deteriorate mechanical properties of molded article. It is more preferable that the number average thickness Ta (mm) is 0.02 mm to 0.30 mm, preferably 0.03 mm to 0.20 mm.

It is preferable that the chopped fiber bundle has an end face along a direction of number average angle θ (0°<θ<90°) from the fiber longitudinal direction. Namely, it is preferable that the chopped fiber bundle has been made by obliquely cutting a fiber bundle. The smaller angle formed by the two lines is defined as the cutting angle. It is preferable that the number average angle θ satisfies "0°<θ<45°", preferably "5°<θ<30°". The upper limit or the lower limit of the preferable ranges can be swapped between the above-described preferable ranges. The obliquely chopped fiber bundle can be excellent in resin impregnation of fiber-reinforced resin molding material and improve in mechanical properties because end part of the chopped fiber bundle in molded article is prevented from being stressed. Accordingly, it is possible to achieve high mechanical properties and low variance as well as high processability making it possible to cut at a desirable angle while suppressing failure of cutting at the same time.

Figure 1:
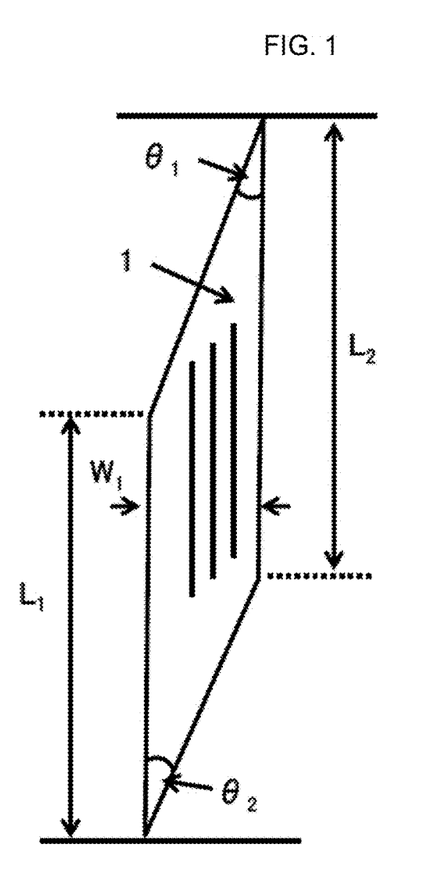
FIG. 1 is a two-dimensional plane projection view of an example of our chopped fiber bundle, showing fiber length, fiber bundle width and acute angles $\theta_1$ and $\theta_2$ of tip angle of chopped fiber bundle.

The number average angle with respect to the fiber longitudinal direction of chopped fiber bundles is determined as follows. A hundred of chopped fiber bundles randomly selected in a chopped fiber bundle mat are subject to a measurement of angles $\theta_1$ and $\theta_2$ formed at both sides of end part of each chopped fiber bundle as depicted in FIG. 1. The measurement results of total 200 points of 100 chopped fiber bundles are averaged to determine the number average angle. Such a measurement may be performed with a computer by an image processing software, or alternatively may be performed by hands with a protractor.

It is preferable that the chopped fiber bundles have a number average filament number of 500 or more and less than 12,000. When the number average filament number is less than 500, chopped fiber bundles having the number average fiber length of 3 mm to 100 mm might bend from the fiber longitudinal direction to lose the fiber straightness in a process of molding a product. Therefore, mechanical properties such as reinforcement of reinforcing fibers in molded articles might not be exhibited sufficiently. On the other hand, the number average filament number of 12,000 or more might have a stress concentration on the end part of chopped fiber bundle in a molded article to increase variance of mechanical properties.

To prepare a chopped fiber bundle mat having the above-described range of number average filament number, continuous fiber bundles having a filament number of 500 or more and less than 12,000 may be cut into the number average fiber length of 3 mm to 100 mm to orient the chopped fiber bundles at random substantively. It is also possible that a plurality of bundles separated along the fiber longitudinal direction from a continuous fiber bundle having a filament number of 1,000 or more are cut into the number average fiber length of 3 mm to 100 mm to orient the chopped fiber bundles at random substantively. It is also possible that a plurality of chopped fiber bundles made by cutting a continuous fiber bundle having a filament number of 1,000 or more into the number average fiber length of 3 mm to 100 mm are split into a plurality of chopped fiber bundles along the fiber longitudinal direction to orient the chopped fiber bundles at random substantively. The above-described two methods can be combined. To prepare a chopped fiber bundle mat having 1,500 filaments, it is possible that 16 bundles each containing 3,000 filaments along the fiber longitudinal direction separated from continuous fiber bundles having filament number of 48,000 are cut to have number average fiber length of 12.5 mm and are further divided into halves by impacting the chopped fiber bundles.

The number average filament number of chopped fiber bundles can be determined as follows. The 100 chopped fiber bundles are subject to a measurement of weight after measuring the number average fiber length. The filament number of one chopped fiber bundle is calculated from fiber length, mass, nominal specific gravity and nominal fiber diameter. The average of filament numbers of 100 chopped fiber bundles is defined as number average filament number.

It is preferable that the chopped fiber bundle mat has a fiber mass per unit area Fm (Fiber basis weight) of 50 g/m² to 5,000 g/m². When the fiber basis weight is more than 5,000 g/m², productivity of molded articles having a thickness from several millimeters to several centimeters might deteriorate because of limited configuration of chopped fiber bundle mat and fiber-reinforced resin molding material. Further, when a chopped fiber bundle mat is impregnated with matrix resin to prepare a fiber-reinforced resin molding material, the mat thickness might necessarily increase to cause insufficient impregnation of matrix resin so that the fiber-reinforced resin molding material and the molded article of fiber-reinforced resin molding material could not be produced with stable quality. When the fiber basis weight is less than 50 g/m², productivity of molded articles having a thickness from several millimeters to several centimeters might deteriorate because many layers of chopped fiber bundle mat and fiber-reinforced resin molding material have to be molded.

It is preferable that our chopped fiber bundle mat has 20% or less of coefficient of variance of fiber mass per unit area Fm (fiber basis weight). From viewpoints of good productivity of fiber-reinforced resin molding material and excellent mechanical properties of molded article, it is preferable that the coefficient of variance of fiber basis weight is smaller. It is more preferable that the coefficient of variance of fiber basis weight is 10% or less, preferably less than that.

The coefficient of variance (%) is calculated by dividing a standard deviation by an average value. We make an evaluation according to measurement results obtained at 10 points randomly selected in a chopped fiber bundle mat.

Figure 2:
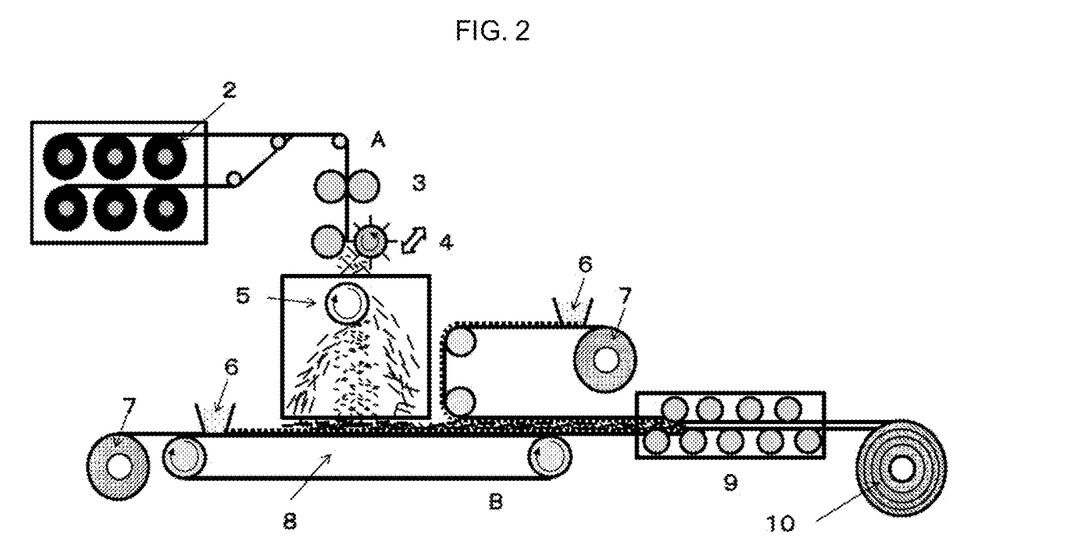
FIG. 2 is a schematic view showing a process comprising a yarn restriction unit traverse mechanism as an example of production method of our fiber-reinforced resin molding material.
Figure 3:
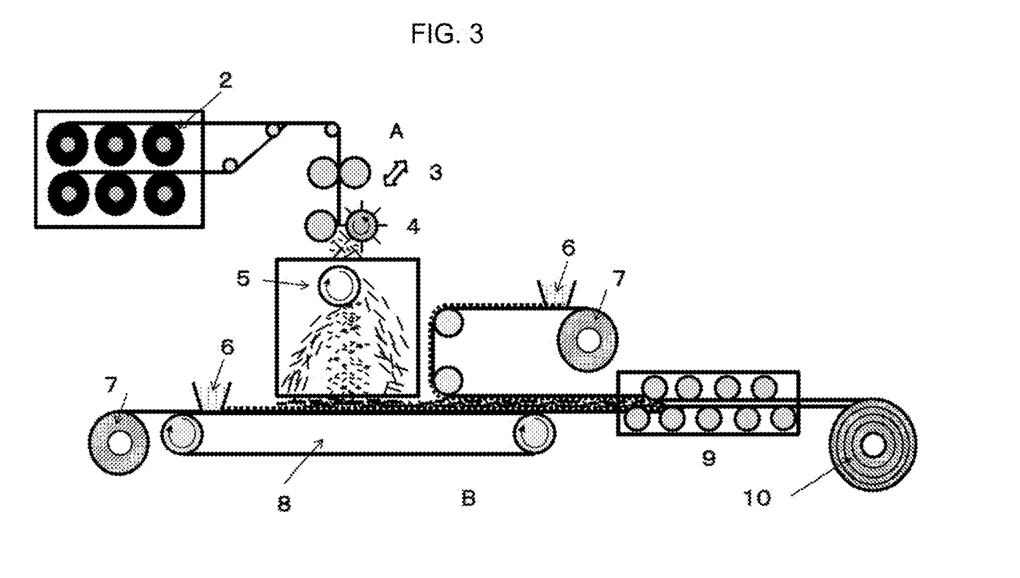
FIG. 3 is a schematic view showing a process comprising a cutter roll traverse mechanism as another example of production method of our fiber-reinforced resin molding material.
Figure 4:
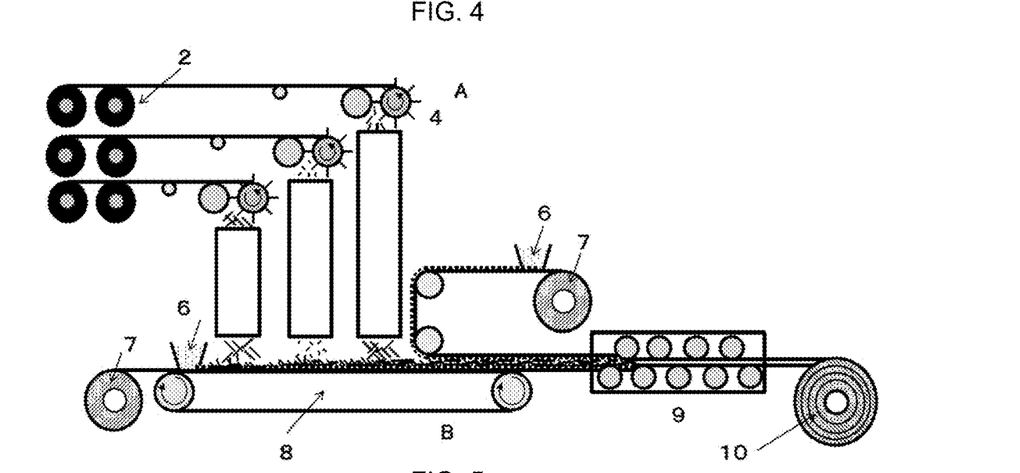
FIG. 4 is a schematic view showing a stepwise dispersion process as another example of production method of our fiber-reinforced resin molding material.

FIGS. 2 to 4 depict desirable process to produce our fiber-reinforced resin molding material through cutting step (A) and sheet-forming step (B), followed by molding step (C) to mold a product.

(A) Cutting Step

A continuous fiber bundle made of reinforcing fibers is cut to prepare chopped fiber bundles. To improve productivity, it is preferable to simultaneously cut a plurality of continuous fiber bundles preliminarily separated into fiber bundles in the fiber longitudinal direction. The chopped fiber bundle can be made by cutting the continuous fiber bundles inserted into a Guillotine cutter or a cutter roll. Specifically to produce a chopped fiber bundle having an oblique cutting angle, it is possible to obliquely insert the continuous fiber bundle into the cutter roll, or alternatively to provide a cutter roll with a spiral blade. To cut the continuous fiber bundle so that chopped fiber bundles [Ao] in the outermost layer have number average fiber length Lao (mm) while chopped fiber bundles [Am] in the middle layer have number average fiber length Lam (mm), it is possible to employ: a method to adjust the cutting interval of the cutter roll; a method to adjust the feed speed of continuous fiber bundle fed to the cutter roll; a method to change the pitch of the cutter roll blade; a method to rotate cutter roll 4 being reciprocated along the rotation axis as depicted in FIG. 2; or a method to cut fiber bundle [A] while making the yarn restriction unit 3 traversed along the rotation axis of cutter roll 4 as depicted in FIG. 3.

The chopped fiber bundles can be adjusted to be oriented at random substantively by a distributor. It is also possible that the chopped fiber bundle is divided into a plurality of chopped fiber bundles when the chopped fiber bundle is brought into contact with the distributor.

As depicted in FIG. 2 or 3, the chopped fiber bundles can be laminated by dispersing selectively the chopped fiber bundles having Lao (mm) by a distributor back and forth of the distributor while there are two kinds of chopped fiber bundles having Lao (mm) or Lam (mm) of number average fiber length. Alternatively, as depicted in FIG. 4, the chopped fiber bundles can be laminated by a stepwise dispersion method, that first disperses the chopped fiber bundles having number average fiber length Lao (mm), second, disperses the chopped fiber bundles having number average fiber length Lam (mm) and third, disperses the chopped fiber bundles having number average fiber length Lao (mm) again.

Figure 5:
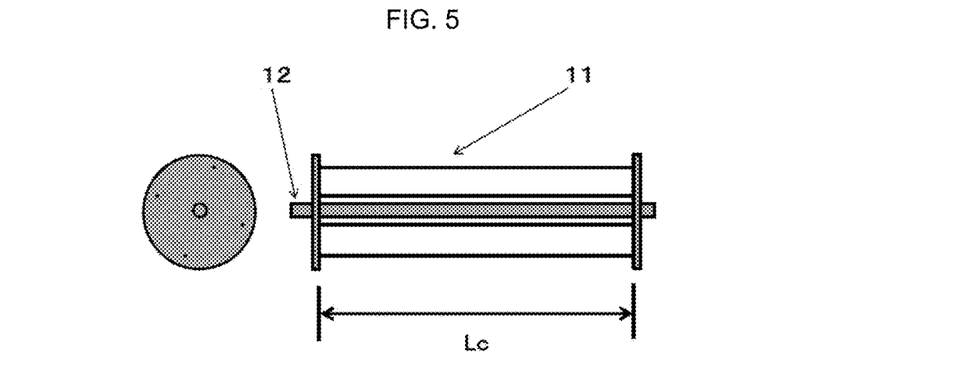
FIG. 5 shows a structure of a distributor.

Although the structure of the distributor is not particularly limited, it is preferable that the distributor having any structure such as cylindrical distributor is provided with some wires 11 on the side face, as depicted in FIG. 5. It is also preferable that the distributor is placed right below cutter roll 4 in a condition that rotation axis 12 of the distributor is perpendicular with both the thickness direction of the chopped fiber bundle mat and the conveying direction of the chopped fiber bundle mat. It is preferable that the distributor has width Lc which is much larger than the cutter roll width.

When the distributor rotates clockwise as depicted with arrows in FIG. 2 or 3, a part of chopped fiber bundles [A] contacts wires 11 above the distributor and is deflected in the chopped fiber bundle mat conveying direction by the impact while the other part of chopped fiber bundles [A] falls down through gaps of wires 11, contacts wires 11 below the distributor and is deflected in a direction opposite to the chopped fiber bundle mat conveying direction by the impact. Although the number of wires is not particularly limited, it is preferable that 4 to 8 wires 11 are provided, preferably 4 to 6 wires. When the number of wires 11 is less than the lower limit of the preferable range, chopped fiber bundles are dispersed mainly below the distributor so that the chopped fiber bundles can easily be deflected in neither the chopped fiber bundle mat conveying direction nor the opposite direction thereof. When the number of wires 11 is more than the upper limit of the preferable range, chopped fiber bundles are dispersed mainly in the chopped fiber bundle mat conveying direction and below the distributor so that they cannot easily be deflected in the opposite direction of the conveying direction. When the chopped fiber bundles are deflected in the conveying direction by the impact of contacting the distributor, heavy chopped fiber bundles such as chopped fiber bundles [A] having a larger fiber length, a larger fiber bundle width or a larger fiber bundle thickness can easily be deflected in the chopped fiber bundle mat conveying direction and the opposite direction thereof by the impact of contacting the distributor so that they tend to localize on the top and bottom faces of chopped fiber bundle mat. Such an effect tends to influence greatly at a larger rotation speed of the distributor. This influence can be suppressed by providing a baffle plate downstream of the distributor in the conveying direction as needed. The layered structure of fiber-reinforced resin material can be controlled by combination of these conditions.

(B) Sheet-Forming Step

The chopped fiber bundle mat is sandwiched from both sides by a sheet-like matrix resin to unify the chopped fiber mat and the matrix resin. The chopped fiber bundle mat is impregnated with matrix resin by means such as pressurization to prepare a sheet-like fiber-reinforced resin molding material. The prepared fiber-reinforced resin molding material using thermosetting resin is generally called an SMC sheet.

(C) Molding Step

Our molded article can be produced by a general press forming method from the above-described fiber-reinforced resin molding material. Namely, the resin molding material having an area smaller than the projection area of cavity and a thickness larger than the cavity thickness is fed to a cavity of mold of which upper and lower molds can be separated having a shape of product to be molded. Next, the material is heated/pressurized and taken a molded article out of the mold opened. The molding temperature, molding pressure and molding time can be selected appropriately according to the shape of product to be molded.

EXAMPLES

Hereinafter, our materials and molded articles will be explained in more detail with reference to figures. An SMC sheet as a fiber-reinforced resin molding material prepared by impregnating a prepared chopped fiber bundle mat with matrix resin is subject to a press forming to evaluate tensile properties as follows.

Raw Materials

Continuous Reinforcing Fiber Bundle:

We employ a carbon fiber bundle ("ZOLTEK (registered trademark)" PX35-50K, fiber number: 50,000) having fiber diameter of 7.2 µm, tensile elastic modulus of 240 GPa and filament number of 50,000.

Matrix Resin [VE]:

The matrix resin is a resin compound prepared by sufficiently blending/stirring the mixture of vinyl ester resin made by DIC Corporation with curing agent, thickener and internal mold release agent.

Evaluation Method of Chopped Fiber Bundle

The fiber-reinforced resin molding material is dissolved by heating with an electric furnace. Randomly-selected 100 chopped fiber bundles are subject to evaluation at the outermost layer parts at the top and bottom sides of the residual chopped fiber bundle and the middle layer part in the middle of thickness direction of the residual chopped fiber bundle.

The fiber length and fiber bundle width of chopped fiber bundle are measured with precision of 0.1 mm by using a vernier caliper while the angle is measured with precision of 1° by using a protractor. The measurement is performed in a condition that samples are placed on a flat surface with no tension.

The thickness of the chopped fiber bundle is measured by the following method. Using a thickness gauge (FS-60DS made by DAIEI KAGAKU SEIKI MFG. Co., Ltd.), chopped fiber bundles are placed between an indenter having flat surface of diameter of 11.28 mm and a flat surface provided in parallel so that the flat surfaces are in parallel with the plane formed by fiber length $L_1$ and fiber bundle width $W_1$ of chopped fiber bundle to measure fiber bundle thickness with precision of 0.01 mm in the condition that 30 g of load is applied by the indenter. The number average fiber bundle thickness of each layer is calculated by averaging thicknesses of 100 chopped fiber bundles of each layer. Number average fiber bundle thickness Ta of chopped fiber bundle [A] is calculated by averaging number average thicknesses of layers.

Evaluation Method of Chopped Fiber Bundle Mat

The chopped fiber bundle mat is cut into 10 pieces of 100 mm×100 mm at the same intervals over the mat width direction and then masses of the pieces are measured with precision of 0.01 g. Fiber mass Fm (fiber basis weight) per unit area of chopped fiber bundle mat is calculated by converting the measured value into mass per 1 m².

Next, mat thickness Tm is measured under a condition of 0.1 kN with a thickness gauge (FS-60DS made by DAIEI KAGAKU SEIKI MFG. Co., Ltd.). Bulkiness Bm is calculated from fiber basis weight Fm and mat thickness Tm.

Evaluation Method of Tensile Properties

Test pieces of 250 mm length×25 mm width for measuring tensile strength are cut out from plate-molded articles prepared in Examples and Comparative Examples. According to testing method of ISO527-4 (1997), tensile strength is measured at gauge length of 150 mm and cross-head speed of 1.0 mm/m. The tensile strengths of 10 test pieces are measured to be averaged for evaluation.

Example 1

A carbon fiber yarn widened to have width of 50 mm were separated by a fiber separation means provided in parallel at interval of 3 mm equally into 16 yarns in the width direction to prepare fiber bundle [A]. Fiber bundle [A] was constantly fed between the nip roll and cutter roll to continuously cut the fiber bundle by rotating cutter roll 4 being reciprocated along the rotation axis as depicted in FIG. 2. Next, the cut fiber bundles were dispersed with a distributor to prepare a chopped fiber bundle mat having 1 m width. The chopped fiber bundle mat had a fiber basis weight of 1,000 g/m².

Next, matrix resin [VE] was uniformly applied with a doctor blade to two sheets of mold release films made of polypropylene to prepare two sheets of resin sheet. The chopped fiber bundle mat was horizontally sandwiched between the two resin sheets and impregnated with resin by a roller to prepare an SMC sheet. The application amount of the resin was adjusted in preparing the resin sheet so that the SMC sheet had reinforcing fiber mass content of 55%.

A cut piece of 250×250 mm of the SMC sheet was placed at the center on the plate-shaped mold having cavity of 300×300 mm (corresponding to 70% of charge rate), and then cured with a heating type press forming machine in a condition of pressurization of 10 MPa at approximately 140° C. for 5 min to mold a plate-molded article of 300×300 mm. The molded article had a tensile strength of 300 MPa. Table 1 shows the evaluation results.

Example 2

A molded article was produced by the same method as Example 1, except that cutter roll 4 was not reciprocated while yarn restriction unit 3 was traversed in the rotation axis direction of cutter roll 4 to cut fiber bundle [A] as depicted in FIG. 3. The molded article had tensile strength of 300 MPa. Table 1 shows the evaluation results.

Example 3

A molded article was produced by the same method as Example 1, except that fiber bundle [A] was dispersed after being cut with cutter rolls having intervals of 13.5 mm and cutter blades inclined at angle of 15° from the fiber bundle longitudinal direction, and then dispersed after being cut with cutter rolls having intervals of 12.5 mm and cutter blades inclined at angle of 15° from the fiber bundle longitudinal direction, and further dispersed after being cut with cutter rolls having intervals of 13.5 mm and cutter blades inclined at angle of 15° from the fiber bundle longitudinal direction, as depicted in FIG. 4. The molded article had tensile strength of 290 MPa. Table 1 shows the evaluation results.

Comparative Example 1

A molded article was produced by the same method as Example 1, except that fiber bundle [A] was cut with cutter rolls not to be reciprocated in the rotation axis direction having intervals of 12.5 mm and cutter blades inclined at angle of 15° from the fiber bundle longitudinal direction. The molded article had a tensile strength of 250 MPa. Table 1 shows the evaluation results.

Comparative Example 2

A molded article was produced by the same method as Example 1, except that fiber bundle [A] was dispersed after being cut with cutter rolls having intervals of 12.5 mm and cutter blades inclined at angle of 15° from the fiber bundle longitudinal direction, and then dispersed after being cut with cutter rolls having intervals of 13.5 mm and cutter blades inclined at angle of 15° from the fiber bundle longitudinal direction, and further dispersed after being cut with cutter rolls having intervals of 12.5 mm and cutter blades inclined at angle of 15° from the fiber bundle longitudinal direction, as depicted in FIG. 4. The molded article had a tensile strength of 290 MPa. Table 1 shows the evaluation results.

Comparative Example 3

A molded article was produced by the same method as Example 1, except that fiber bundle [A] was dispersed after being cut with cutter rolls having intervals of 13.5 mm and cutter blades inclined at angle of 15° from the fiber bundle longitudinal direction, and then a carbon fiber yarn widened to have width of 36 mm were separated by a fiber separation means provided in parallel at interval of 4.5 mm equally into 8 yarns in the width direction to prepare a fiber bundle, which was dispersed after being cut with cutter rolls having intervals of 12.5 mm and cutter blades inclined at angle of 15° from the fiber bundle longitudinal direction, and further dispersed after being cut with cutter rolls having intervals of 13.5 mm and cutter blades inclined at angle of 15° from the fiber bundle longitudinal direction, as depicted in FIG. 4. The molded article had a tensile strength of 290 MPa. Table 1 shows the evaluation results.

TABLE 1

|  |  | Unit | Examples 1 | Examples 2 | Examples 3 | Comparative Examples 1 | Comparative Examples 2 | Comparative Examples 3 |
|---|---|---|---|---|---|---|---|---|
| Raw materials | Reinforcing fiber | — | [A] | [A] | [A] | [A] | [A] | [A] |
|  | Matrix resin | — | [VE] | [VE] | [VE] | [VE] | [VE] | [VE] |
| Chopped fiber bundle | Number average fiber length Lao1 (top side) of outermost layer | mm | 13.7 | 13.4 | 13.5 | 12.5 | 12.4 | 13.6 |
|  | Number average fiber length Lam of middle layer | mm | 11.6 | 11.9 | 12.5 | 12.5 | 13.5 | 12.4 |
|  | Number average fiber length Lao2 (bottom side) of outermost layer | mm | 12.7 | 13.3 | 13.5 | 12.5 | 12.5 | 13.5 |
|  | Lao1/Lam | — | 1.18 | 1.13 | 1.08 | 1.00 | 0.92 | 1.10 |
|  | Lao2/Lam | — | 1.10 | 1.12 | 1.08 | 1.00 | 0.93 | 1.09 |
|  | Number average fiber width Wao1 (top side) of outermost layer | mm | 1.6 | 2.1 | 2.3 | 2.0 | 2.4 | 1.6 |
|  | Number average fiber width Wam of middle layer | mm | 1.4 | 1.6 | 1.6 | 2.0 | 1.5 | 2.4 |
|  | Number average fiber width Wao2 (bottom side) of outermost layer | mm | 2.0 | 2.3 | 2.3 | 2.0 | 2.3 | 1.5 |
|  | Wao1/Wam | — | 1.18 | 1.32 | 1.42 | 1.00 | 1.60 | 0.67 |
|  | Wao2/Wam | — | 1.45 | 1.42 | 1.42 | 1.00 | 1.53 | 0.63 |
|  | Number average fiber thickenss Tao1 (top side) of outermost layer | mm | 0.06 | 0.07 | 0.08 | 0.07 | 0.09 | 0.07 |
|  | Number average fiber thickness Tam of middle layer | mm | 0.05 | 0.06 | 0.07 | 0.07 | 0.07 | 0.09 |
|  | Number average fiber thickness Tao2 (bottom side) of outermost layer | mm | 0.08 | 0.08 | 0.08 | 0.07 | 0.08 | 0.07 |
|  | Tao1/Tam | — | 1.20 | 1.17 | 1.14 | 1.00 | 1.31 | 0.81 |
|  | Tao2/Tam | — | 1.60 | 1.33 | 1.14 | 1.00 | 1.26 | 0.76 |
|  | Angle | ° | 10 | 10 | 10 | 10 | 10 | 10 |
| Chopped fiber bundle mat | Fiber basis weight Fm | g/m² | 1,000 | 1,000 | 1,000 | 1,000 | 1,000 | 1,000 |
|  | Mat thickness Tm | mm | 3.0 | 3.0 | 3.0 | 3.0 | 3 | 3 |
|  | Bulkiness Bm | cm³/g | 3.0 | 3.0 | 3.0 | 3.0 | 3 | 3 |
| Fiber-reinforced resin molding material | Resin impregnation | — | Good | Good | Good | Good | Acceptable | Acceptable |
| Molded article | Molded plate quality | — | Good | Good | Good | Acceptable | Acceptable | Acceptable |
|  | Tensile strength | MPa | 300 | 300 | 290 | 250 | 240 | 235 |

INDUSTRIAL APPLICATIONS

Our fiber-reinforced resin molding materials and molded articles are applicable to members demanding lightweight properties and excellent mechanical properties such as automotive member like door, bumper-reinforcing material and sheet (panel or frame), bicycle member like crank and wheel rim, sport gear member like golf club and tennis racket, traffic vehicle/aircraft member like interior material, and industrial machinery member like robot arm. Above all, our materials and molded articles are suitably applicable to automotive members such as doors, bumper-reinforcing material and sheets (panels or frames) demanding complicated-shape followability as well as lightweight properties.

The invention claimed is:

1. A fiber-reinforced resin molding material [C] of a chopped fiber bundle [A] impregnated with a matrix resin [B], having a layered structure including three or more layers in a thickness direction of the fiber-reinforced resin molding material [C] and satisfying Formula (1) and Formula (3), wherein Lao and Tao are respectively a number average fiber length and a number-average fiber bundle thickness of a chopped fiber bundle [Ao] in an outermost layer, Lam and Tam are respectively a number average fiber length and a number-average fiber bundle thickness of a chopped fiber bundle [Am] in a middle layer, $$Lao > Lam \quad (1)$$

$$Tao > Tam \quad (3).$$

2. The fiber-reinforced resin molding material according to claim 1, further satisfying Formula (2), wherein Wao is a number average fiber bundle width of the chopped fiber bundle [Ao] in the outermost layer and Wam is a number average fiber bundle width of the chopped fiber bundle [Am] in the middle layer, $$Wao > Wam \quad (2)$$

3. The fiber-reinforced resin molding material according to claim 2, further satisfying Formula (6), wherein Tao is a number average fiber bundle thickness of the chopped fiber bundle [Ao] in the outermost layer and Tam is a number average fiber bundle thickness of the chopped fiber bundle [Am] in the middle layer, $$1.01 < Tao/Tam < 2.00 \quad (6).$$

4. The fiber-reinforced resin molding material according to claim 1, further satisfying Formula (5), wherein Wao is a number average fiber bundle width of the chopped fiber bundle [Ao] in the outermost layer and Wam is a number average fiber bundle width of the chopped fiber bundle [Am] in the middle layer, $$1.05 < Wao/Wam < 1.50 \quad (5).$$

5. The fiber-reinforced resin molding material according to claim 1, wherein a number average fiber length La of the chopped fiber bundle [A] is 3 mm or more and 100 mm or less.

6. The fiber-reinforced resin molding material according to claim 1, wherein a number average fiber bundle width Wa of the chopped fiber bundle [A] is 0.1 mm or more and 60 mm or less.

7. The fiber-reinforced resin molding material according to claim 1, wherein a number average fiber bundle thickness Ta of the chopped fiber bundle [A] is 0.01 mm or more and 0.50 mm or less.

8. The fiber-reinforced resin molding material according to claim 1, wherein a cutting angle θ of the chopped fiber bundle [A] is 0°<θ<90°.

9. The fiber-reinforced resin molding material according to claim 1, wherein the matrix resin [B] is a thermosetting resin selected from the group consisting of vinyl ester resin, epoxy resin and unsaturated polyester resin.

10. A molded article made by a compression forming of the fiber-reinforced resin molding material according to claim 1.

11. A fiber-reinforced resin molding material [C] of a chopped fiber bundle [A] impregnated with a matrix resin [B], having a layered structure including three or more layers in a thickness direction of the fiber-reinforced resin molding material [C] and satisfying Formula (1) and Formula (2), wherein Lao and Wao are respectively a number average fiber length and a number-average fiber bundle width of a chopped fiber bundle [Ao] in an outermost layer, Lam and Wam are respectively a number average fiber length and a number-average fiber bundle width of a chopped fiber bundle [Am] in a middle layer, further satisfying Formula (4), wherein the Lao is the number average fiber length of the chopped fiber bundle [Ao] in the outermost layer and the Lam is the number average fiber length of the chopped fiber bundle [Am] in the middle layer, $$Lao > Lam \quad (1)$$

$$Wao > Wam \quad (2)$$

$$1.05 < Lao/Lam < 1.30 \quad (4).$$

12. The fiber-reinforced resin molding material according to claim 11, further satisfying Formula (3), wherein Tao is a number average fiber bundle thickness of the chopped fiber bundle [Ao] in the outermost layer and Tam is a number average fiber bundle thickness of the chopped fiber bundle [Am] in the middle layer, $$Tao > Tam \quad (3).$$

* * * * *